United States Patent
Jacobson et al.

(10) Patent No.: US 10,654,759 B2
(45) Date of Patent: May 19, 2020

(54) SYSTEM AND METHODS FOR ADDITION OF BENEFICIAL AGRICULTURAL, BIOLOGICAL, AND/OR DEDUSTING ADDITIVES TO GRANULAR FERTILIZERS

(71) Applicant: The Mosaic Company, Plymouth, MN (US)

(72) Inventors: Kathlene Laurie Jacobson, Saskatoon (CA); Bryan Todd Baylor, Lithia, FL (US); Lauren A. Balaban, Wimauma, FL (US); Troy William Hobbs, Plymouth, MN (US); Timothy Gene Holt, Florence, AL (US)

(73) Assignee: The Mosaic Company, Plymouth, MN (US)

( * ) Notice: Subject to any disclaimer, the term of this patent is extended or adjusted under 35 U.S.C. 154(b) by 13 days.

(21) Appl. No.: 14/913,091

(22) PCT Filed: Aug. 19, 2014

(86) PCT No.: PCT/US2014/051662
§ 371 (c)(1),
(2) Date: Feb. 19, 2016

(87) PCT Pub. No.: WO2015/026806
PCT Pub. Date: Feb. 26, 2015

(65) Prior Publication Data
US 2016/0200637 A1 Jul. 14, 2016

Related U.S. Application Data

(60) Provisional application No. 61/968,328, filed on Mar. 20, 2014, provisional application No. 61/867,334, filed on Aug. 19, 2013.

(51) Int. Cl.
C05B 7/00 (2006.01)
C05B 17/00 (2006.01)
(Continued)

(52) U.S. Cl.
CPC ............ *C05G 3/0052* (2013.01); *B05B 15/00* (2013.01); *C05B 7/00* (2013.01); *C05B 17/00* (2013.01);
(Continued)

(58) Field of Classification Search
None
See application file for complete search history.

(56) References Cited

U.S. PATENT DOCUMENTS 2,739,886 A 3/1956 Facer
3,304,249 A * 2/1967 Katz .......................... B01J 8/42
204/155

(Continued)

FOREIGN PATENT DOCUMENTS

AU 554749 B1 9/1986
AU 754223 B2 11/2002
(Continued)

OTHER PUBLICATIONS

Office Action dated May 4, 2017 for Moroccan Application No. 38911, 4 pages.
(Continued)

*Primary Examiner* — Wayne A Langel
(74) *Attorney, Agent, or Firm* — Patterson Thuente Pedersen, P.A.

(57) ABSTRACT

Methods and related systems for conditioning of granular fertilizers post-manufacture to reduce the generation of dust during handling, transport, and storage of the fertilizers, and/or to increase the agricultural benefits of the fertilizer. The method includes introducing a quantity of an aqueous conditioning agent, such as by spraying, to a plurality of fertilizer granules. The aqueous conditioning agent can include one or more beneficial agricultural and/or dedusting additives including one or more acidifying agents, one or (Continued)

more drying agents, one or more herbicides and/or pesticides, one or more chelating agents, one or more biological agents, and combinations thereof.

16 Claims, 1 Drawing Sheet

(51) Int. Cl.
    *C05G 3/00*           (2020.01)
    *B05B 15/00*         (2018.01)
    *C05G 3/02*           (2006.01)
    *C05F 11/08*         (2006.01)

(52) U.S. Cl.
    CPC ............ *C05F 11/08* (2013.01); *C05G 3/0041* (2013.01); *C05G 3/0088* (2013.01); *C05G 3/02* (2013.01)

(56) References Cited

U.S. PATENT DOCUMENTS

| | | | |
|---|---|---|---|
| 3,560,192 A | | 2/1971 | Di Cicco |
| 3,708,275 A | | 1/1973 | Camp, Jr. |
| 3,734,707 A | * | 5/1973 | Seymour .................... B01J 2/28 71/30 |
| 3,854,923 A | | 12/1974 | Ott |
| 3,953,192 A | * | 4/1976 | Hodgson .................... B01J 2/30 71/59 |
| 4,319,910 A | | 3/1982 | Meyer |
| 4,507,142 A | | 3/1985 | Pace et al. |
| 4,581,056 A | | 4/1986 | Noodén et al. |
| 4,581,057 A | | 4/1986 | Noodén |
| 5,328,497 A | * | 7/1994 | Hazlett ...................... B01J 2/30 71/26 |
| 5,360,465 A | * | 11/1994 | Buchholz ................... B01J 2/30 71/11 |
| 5,366,532 A | | 11/1994 | Fages et al. |
| 5,383,952 A | * | 1/1995 | Singewald ................. B01J 2/30 252/384 |
| 5,433,766 A | | 7/1995 | Ming et al. |
| 5,451,242 A | | 9/1995 | Ming et al. |
| 5,849,060 A | | 12/1998 | Diping et al. |
| 5,851,260 A | | 12/1998 | Äijäälä et al. |
| 5,968,222 A | * | 10/1999 | Kodali ...................... B01J 2/006 427/220 |
| 6,311,426 B1 | | 11/2001 | Mehta et al. |
| 6,322,607 B1 | | 11/2001 | Brown et al. |
| 6,331,300 B1 | * | 12/2001 | Dybas ....................... B09C 1/002 210/601 |
| 6,346,131 B1 | | 2/2002 | Bergevin |
| 6,491,736 B1 | * | 12/2002 | Bell ......................... C05G 3/0088 71/31 |
| 6,544,313 B2 | | 4/2003 | Peacock et al. |
| 6,797,277 B2 | | 9/2004 | Heier et al. |
| 7,297,314 B2 | * | 11/2007 | Natsuyama ............... B01J 2/006 118/309 |
| 7,410,522 B2 | | 8/2008 | Green |
| 7,445,657 B2 | | 11/2008 | Green |
| 7,497,891 B2 | | 3/2009 | Peacock |
| 7,691,169 B2 | | 4/2010 | McCoy, Jr. |
| 8,110,017 B2 | | 2/2012 | Wells |
| 8,221,515 B2 | | 7/2012 | Goodwin |
| 8,497,229 B2 | | 7/2013 | Van Boxtel-Verhoeven et al. |
| 8,506,670 B2 | | 8/2013 | Varadachari |
| 8,557,013 B2 | * | 10/2013 | Burnham ................... C05B 17/00 210/710 |
| 9,199,883 B2 | | 12/2015 | Peacock et al. |
| 2002/0098982 A1 | * | 7/2002 | Burnham ................... C05D 9/02 504/359 |
| 2005/0020449 A1 | | 1/2005 | Blais |
| 2006/0081028 A1 | | 4/2006 | Hammons |
| 2007/0131009 A1 | | 6/2007 | Westbrook et al. |
| 2010/0170314 A1 | | 7/2010 | Goodwin |
| 2011/0000268 A1 | | 1/2011 | Schaafsma et al. |
| 2011/0077155 A1 | | 3/2011 | Goodwin |
| 2011/0154874 A1 | * | 6/2011 | Rahn ........................ C05C 9/005 71/21 |
| 2011/0214465 A1 | | 9/2011 | Peacock et al. |
| 2012/0073341 A1 | | 3/2012 | Goodwin |
| 2012/0090367 A1 | | 4/2012 | Wright et al. |
| 2014/0352376 A1 | | 12/2014 | Carpenter |
| 2015/0141244 A1 | | 5/2015 | Hellwege et al. |
| 2015/0141245 A1 | | 5/2015 | Wachendorff-Neumann et al. |
| 2015/0141246 A1 | | 5/2015 | Hellwege et al. |
| 2015/0148228 A1 | | 5/2015 | Wachendorff-Neumann et al. |
| 2015/0210603 A1 | | 7/2015 | Du et al. |
| 2015/0251962 A1 | | 9/2015 | Peacock et al. |
| 2015/0376076 A1 | | 12/2015 | Ward et al. |
| 2016/0083308 A1 | | 3/2016 | Peacock et al. |
| 2017/0044078 A1 | | 2/2017 | McLaughlin et al. |
| 2017/0057881 A1 | | 3/2017 | Goodwin et al. |
| 2017/0066693 A1 | | 3/2017 | Ledoux |
| 2017/0197890 A1 | | 7/2017 | Jacobson |

FOREIGN PATENT DOCUMENTS

| | | | | |
|---|---|---|---|---|
| CN | 101885635 A | | 11/2010 | |
| CN | 102652111 A | | 8/2012 | |
| CN | 102781880 A | | 11/2012 | |
| CN | 101993285 B | | 6/2013 | |
| DE | 136956 | * | 8/1979 | |
| EP | 0470287 A1 | | 2/1992 | |
| GB | 2023109 | * | 12/1979 | ............... C05B 1/00 |
| JP | S 49105800 | | 10/1974 | |
| JP | S 61125631 | | 6/1986 | |
| JP | 02-275792 A | | 11/1990 | |
| JP | 07-109192 A | | 4/1995 | |
| JP | 63-112484 A | | 5/1998 | |
| JP | 11-209190 A | | 8/1999 | |
| JP | 2000-044376 A | | 2/2000 | |
| JP | 2000143378 A | | 5/2000 | |
| JP | 2003-192483 A | | 7/2003 | |
| KR | 10-1999-0034842 A | | 5/1999 | |
| KR | 10-1999-0046371 A | | 7/1999 | |
| KR | 10-2002-0060680 A | | 7/2002 | |
| KR | 10-0399401 B1 | | 9/2003 | |
| RU | 2125549 C1 | | 1/1999 | |
| UA | 73120 C2 | | 4/2002 | |
| WO | WO 95/06623 | | 3/1995 | |
| WO | WO 95/08521 | | 3/1995 | |
| WO | WO 99/15480 | | 4/1999 | |
| WO | WO 00/64837 A1 | | 11/2000 | |
| WO | WO 2008/000492 A2 | | 1/2008 | |
| WO | WO 2011/073017 A1 | | 6/2011 | |
| WO | WO 2011/080764 A1 | | 7/2011 | |
| WO | WO 2011/082301 A2 | | 7/2011 | |
| WO | WO 2014/193946 A1 | | 12/2014 | |
| WO | WO 2015/026806 A1 | | 2/2015 | |

OTHER PUBLICATIONS

Search Report dated Jun. 30, 2017 for EP Application No. 14838566. 9, 10 pages.
Database WPI; Week 201127, Thomson Scientific, London, GB, AN 2010-Q3017, 11 pages.
Office Action dated Sep. 20, 2017 for Ukraine Application No. a 2016 02614, 11 pages.
Office Action dated Apr. 2, 2017 for Saudi Arabia Application No. 516370591, 7 pages.
Office Action for Pakistan Application No. 576/2014, known to applicant at least as of Apr. 3, 2017, 1 page.
Communication dated Feb. 23, 2017 for EP Application No. 14838566. 9, 5 pages.
Office Action dated Dec. 1, 2016 for Saudi Arabia Application No. 516370591, 7 pages.
Office Action dated Apr. 20, 2018 for Russian Application No. 2016109808, 15 pages.
Search Report and Written Opinion dated Nov. 21, 2016 for PCT Application No. PCT/US2016/046717, 17 pages.

(56) References Cited

OTHER PUBLICATIONS

PCT International Search Report and Written Opinion for International Application No. PCT/US2014/051662, dated Nov. 11, 2014, 16 pages.
Search Report and Written Opinion dated Feb. 13, 2018 for PCT Application No. PCT/US2016/046717, 13 pages.
Application and File history for U.S. Appl. No. 15/235,499, filed Aug. 12, 2016. Inventors: McLaughlin et al.
Office Action dated Jul. 4, 2018 for Japanese Application No. 2016-0536375, 10 pages.
Office Action dated Jul. 19, 2018 for Colombian Application No. 16-066.122, 16 pages.
Communication dated Nov. 16, 2018 for EP Application No. 14838566.9, 8 pages.
Office Action dated Jul. 19, 2018 for Moroccan Application No. 42163, 4 pages.
Office Action dated Sep. 26, 2018 for Pakistan Application No. 497/2016, 2 pages.
Examination Report dated Nov. 16, 2018 for Australian Application No. 2014309005, 5 pages.
Office Action dated Sep. 16, 2018 for Israeli Application No. 244183, 4 pages.
Neumeier, Anna. "Potash Processing: Pelletizing vs. Compaction Granulation" FEECO International. http://feeco.com:80/2014/01/02/potash-processing-pelletizing-compaction-granulation/, Jan. 2, 2014, 4 pages.
Ivell, David M., and Van T. Nguyen. "The Evolution of Screening Systems for Optimum Granular Fertilizer Product Quality." Procedia Engineering 83 (Jan. 1, 2014): 328-335, 8 pages.
Application and File history for U.S. Appl. No. 15/324,473, filed Jan. 6, 2017. Inventors: Jacobson et al.
PCT International Preliminary Report on Patentability dated Jan. 19, 2017 for International Application No. PCT/US2015/039302, 10 pages.
PCT International Search Report dated Aug. 28, 2015 for PCT Application No. PCT/US2015/039302, dated Aug. 28, 2015, 4 pages.
PCT Written Opinion dated Aug. 28, 2015 for PCT Application No. PCT/US2015/039302, 8 pages.
Office Action dated Dec. 11, 2018 for Chinese Application No. 20140057610.3, 12 pages.
Office Action dated Jan. 11, 2019 for Belarus Application No. a20160095, 6 pages.
Office Action dated Feb. 19, 2019 for Indonesian Application No. P00201601796, 6 pages.
Office Action dated Mar. 18, 2019 for Australian Application No. P00201601796, 4 pages.
Office Action dated Mar. 14, 2019 for Indian Application No. 201617006213, 8 pages.
Office Action dated Mar. 13, 2019 for Morocco Application No. PV/42163, 5 pages.
Office Action dated Jul. 26, 2019 for Chinese Application No. 201480057610.3, 6 pages.
Communication dated Aug. 9, 2019 for EP Application No. 15819711.1, 9 pages.
Manish Vashishtha et al.: "Improvement in properties of urea by phosphogypsum coating", International Journal of ChemTech Research, Jan. 1, 2010, 10 pages.
Office Action dated May 11, 2019 for Malaysian Application No. PI2016700560, 3 pages.
Office Action dated Nov. 13, 2019 for Brazilian Application No. BR112016003586.0, 6 pages.
Office Action dated Feb. 3, 2020 for Chinese Application No. 201480057610.3, 19 pages.
Office Action dated Feb. 21, 2020 for New Zealand Application No. 717735, 4 pages.

\* cited by examiner

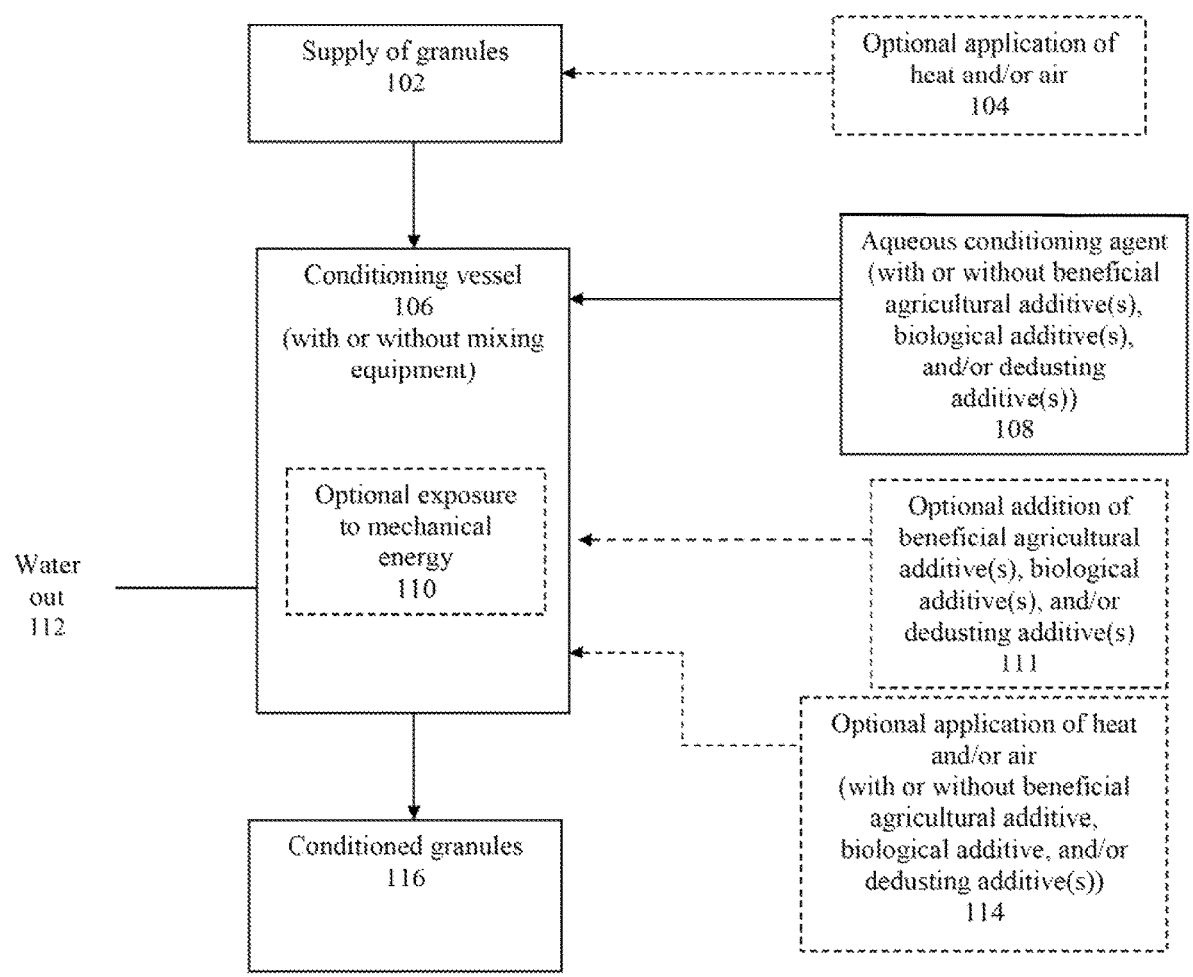

SYSTEM AND METHODS FOR ADDITION OF BENEFICIAL AGRICULTURAL, BIOLOGICAL, AND/OR DEDUSTING ADDITIVES TO GRANULAR FERTILIZERS

RELATED APPLICATIONS

The present application is a national phase entry of PCT Application No. PCT/US2014/051662, filed Aug. 19, 2014, which claims the benefit of U.S. Provisional Application No. 61/867,334 filed Aug. 19, 2013, and U.S. Provisional Application No. 61/968,328 filed Mar. 20, 2014, each of which is incorporated herein in its entirety by reference.

FIELD OF THE INVENTION

The present invention is directed to a system and related method of reducing dust generated during handling, transporting, and storage of granulated fertilizer. Specifically, the present invention is directed to a system and related method for conditioning the granular fertilizer by a water-based treatment or aqueous conditioning agent for reducing dust generation and/or for the addition of beneficial agricultural, biological, and/or dedusting additives.

BACKGROUND OF THE INVENTION

Agricultural inorganic fertilizers typically include a base comprising at least one of three primary inorganic nutrients—nitrogen (N), phosphate (P), and potassium (K). These fertilizers are identified by their NPK rating in which the N value is the percentage of elemental nitrogen by weight in the fertilizer, and the P and K values represent the amount of oxide in the form of $P_2O_5$ and $K_2O$ that would be present in the fertilizer if all the elemental phosphorus and potassium were oxidized into these forms. The N—P—K proportions or concentration vary across fertilizer types and user needs.

For example, the base fertilizer can comprise a phosphate fertilizer (such as monoammonium phosphate ("MAP"), diammonium phosphate ("DAP")), a potash fertilizer (such as muriate of potash ("MOP")) or other potassium-based fertilizer, or a nitrogen-based fertilizer such as a fertilizer containing urea. The fertilizers can also include any combination of secondary nutrients and/or micronutrients. The secondary nutrients can include sulfur compounds, calcium, and/or magnesium, and the micronutrients can include iron, manganese, zinc, copper, boron, molybdenum, and/or chlorine. The micronutrients and/or secondary nutrients can be added to solution in their elemental form, or as compounds, such as a salt.

Many of these agricultural fertilizers are granulated, dried, and treated with dust control agents after formulation to provide the fertilizer in a stable and easily handled form. An inherent drawback of the conventional granulation process is that a significant portion of the fertilizer may generate dust particulates either during manufacture, storage, or in distribution, which is significantly more difficult to handle and distribute on the fields to be treated. In addition to wasting otherwise useful fertilizer, the fertilizer may create undesirable fugitive particle emissions. Fugitive particulate emissions can be mitigated, but in certain conditions mitigation costs can become uneconomical.

To reduce the dust generation, the fertilizer granules are often coated with an anti-dust coating that reduces or entraps the dust created during the granulation or transport. The anti-dust coating can comprise, for example, petroleum, wax, or other oil-based liquids that are sprayed onto the fertilizer granules to adhere any dust particulates formed, during granulation or transport, for example, to the larger fertilizer granules. The coating also encapsulates the dust particulates to prevent or inhibit the dust particulates from becoming airborne.

While traditional coatings are effective at controlling the dust particulates, the inherent drawback of these coatings is that the coatings have a limited effective shelf-life and can have diminishing effectiveness as the coating ages. Prolonged storage or transport of the coated fertilizer can present a greater safety risk as the storage or transport time may have exceeded the effective life of the coating resulting in unsafe fertilizer products, and/or undesirable flow characteristics in storage bins, transportation equipment, and field application equipment. Furthermore, these traditional coatings can potentially add significant cost to the end-product due to the cost of the coating composition and/or increased manufacturing costs. Alternative dedusting agents with extended shelf life are commercially available but these products tend to have substantially higher cost and for this reason have not been broadly adopted by the industry.

As such, there is a need for a means of efficiently and effectively reducing dust generated during the handling of granular fertilizers and/or to increase the agricultural benefits of the fertilizer.

SUMMARY OF THE INVENTION

The present invention is directed to a method and related system for conditioning of granular fertilizers post-manufacture to reduce the generation of dust during handling, transport, and storage of the fertilizers, and/or to increase the agricultural benefits of the fertilizer. The method includes introducing a quantity of an aqueous conditioning agent, such as by spraying, to a plurality of fertilizer granules having a surface temperature of about 50° F. to about 250° F., and more particularly about 130° F. to about 200° F., and a crude moisture content of about 0 to about 6.5 weight percent (wt %), more particularly from about 0.5 wt % to about 3 wt % and more particularly from about 0.5 wt % to about 1.5 wt %, in a conditioning vessel. The aqueous conditioning agent can comprise water only or a water-based solution in the form of liquid, steam, and/or superheated steam, and with or without beneficial agricultural and/or dedusting additives. The aqueous conditioning agent is introduced at a temperature of about 32° F. to about 800° F. depending on the form of the agent, and more particularly from about 70° F. to about 170° F. when the agent is in the form of water, with or without beneficial agricultural and/or dedusting additives.

Alternatively, one or more beneficial agricultural and/or dedusting additives are introduced onto the surface of the granules separate from the aqueous conditioning agent (with or without additives). The one or more additives can be added simultaneously or in series with the aqueous conditioning agent.

As mentioned above, the aqueous conditioning agent can optionally contain one or more beneficial agricultural and/or dedusting additives, such as, for example, but not limited to, one or more acidifying agents (e.g., but not limited to, citric acid, sulfuric acid, phosphoric acid, sulfamic acid, and combinations thereof), one or more drying agents (e.g., but not limited to, corn starch, and/or wheat starch), and/or one or more chelating agents (e.g., but not limited to, ethylenediaminetetraacetic acid (EDTA), polyethylenimine (PEI)), or combinations thereof, in an amount of about 0.01 wt % to about 99.99 wt % of solution (i.e. weight of solute/weight of solution), and more particularly from about 0.01 wt % to about 20 wt % of solution for certain applications, from about 20 wt % to about 50 wt % of solution for other applications, and from about 50 wt % to about 99.99 wt % for yet other applications.

In an alternative embodiment of the invention, in addition to or as an alternative to the additives listed above, the aqueous conditioning agent can contain one or more beneficial agricultural additives selected from one or any combination of secondary nutrients and/or micronutrients in an amount of about 0.01 wt % to about 99.99 wt % of solution, and more particularly from about 20 wt % to about 50 wt % of solution. The secondary nutrients can include sulfur compounds, calcium, and/or magnesium, and the micronutrients can include iron, manganese, zinc, copper, boron, molybdenum, and/or chlorine. The micronutrients and/or secondary nutrients can be added to solution in their elemental form, or as compounds, such as a salt.

In yet other embodiments, in addition to or as an alternative to the additives listed above, the aqueous conditioning agent can contain one or more beneficial agricultural additives selected from one or any combination of herbicides and/or pesticides.

In addition to or as an alternative to the additives listed above, other embodiments of the aqueous conditioning agent can comprise one or more beneficial agricultural additives selected from one or any combination of biological material. In some aspects, the biological materials, or "biologicals," can comprise, for example, one or more biological chemicals, plant and other extracts, microbial agents, and/or other living organisms. In some embodiments, the biological material can comprise microorganisms, including, but not limited to, bacteria such as *Bacillus, Rhizobium, Azobacter*, and *Azospirillum*, fungi such as *Aspergillus, Mycorhizzae, Beauveria, Metarhizium*, and *Trichoderma*, and/or yeast such as *Saccharomyces, Schizosaccharomyces, Sporobolomyces, Candida, Trichosporon*, and *Rhodosporidium*. In other cases, the aqueous conditioning agent can comprise biological materials that are small molecule and peptide-based compositions such as, but not limited to, metabolites, peptides, lipopetides, hormones, peptide hormones, siderophores, glycopepetides, humates, surfactants, vitamins, enzymes, amino acids and amino acid derivatives, and nucleic acids and nucleic acid derivatives. In some embodiments, biologicals included in embodiments of the aqueous conditioning agent can be applied to fertilizers or fertilizer granules at a final concentration of about $10^3$ to about $10^{12}$ CFU (colony forming units)/g, and more particularly about $10^6$ to about $10^9$ CFU/g. Biologicals applied accordingly have the potential to enhance the growth and development of plants as well as treat plant diseases.

The granules with aqueous conditioning agent(s) applied thereto are then optionally subjected to a mechanical energy exposure, such as in the form of tumbling or mixing, in the conditioning vessel to induce desired particle interactions between particles. In an alternative embodiment, the granules and the aqueous conditioning agent are introduced into a fluidized bed reactor such that the surface of each individual granule is subjected to surface conditioning described above, without necessarily being subjected to particle to particle interaction or mechanical energy exposure. In yet another alternative embodiment, the granules are exposed to a combination of particle to particle interactions (e.g. tumbling or mixing) and introduced into a fluidized bed reactor in either order, or in any combination.

The added moisture from the aqueous conditioning agent is removed from the granules either naturally or with the application of energy. This can be accomplished in the conditioning vessel itself either during the optional tumbling and/or after tumbling of the granules. The drying can be done by drying via a dry airstream (heated or non-heated) such as a fugitive dust air stream for removal of water vapor, dust, and air, a heated dryer such as a blower, until a final moisture content of about 0 wt % to about 6.5 wt % of the granules is achieved, more particularly from about 0.5 wt % to about 3.0 wt, and even more particularly from about 0.5 wt % to about 1.5 wt %, resulting in conditioned fertilizer granules.

The conditioning process can be placed in-line after granulation and/or drying of the fertilizer granules, or at a remote location, i.e. off-line. For example, the conditioning process can be achieved in a warehouse, separate processing facility, at a transportation site, or any of a variety of locations.

The conditioning of the granular fertilizers by water treatment allows for the reduction in application of dust control agents, such as the oil-based coatings described above, thereby reducing raw material costs. Also, reduction in dust generated during distribution from the manufacturer to the grower results in improved industrial hygiene for the manufacturers, transporters, customers, and/or customer employees, thereby reducing the costs and equipment otherwise needed to mitigate potential industrial hygiene issues. Finally, when beneficial agricultural additives are incorporated, the conditioned granules can have increased agricultural benefits compared to unconditioned granules.

The conditioning methods and systems described above are not limited to the treatment of fertilizer granules. The methods and systems according to embodiments can be used on any granular or particular material that has the propensity to produce unwanted or fugitive dust. Other uses can include, for example, the conditioning of coal, feed products such as feed supplements or pellets, food processing, mining operations including ores and tailings, cured or dried cement, dirt, gravel or sand, waste, asbestos, or any of variety of uses.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE FIGURES

FIG. 1 is a process flow diagram of a conditioning method according to an embodiment of the invention.

DETAILED DESCRIPTION OF THE DRAWINGS

Referring to FIG. 1, a non-limiting exemplary embodiment of a system and method for conditioning fertilizer granules for improved dust control and/or agricultural benefits generally includes the supply of a plurality of fertilizer granules at 102. The fertilizer granules can be unconditioned or can be previously condition in which additional conditioning is desired or required. The granules are not limited to fertilizer granules, and can comprise any of a variety of granular or particular materials.

In this non-limiting embodiment, the fertilizer granules can be any of a number of fertilizer types including, but not limited to inorganic including nitrogen-based (e g ammonium nitrate or urea), phosphorous-based (e.g. phosphate fertilizers including mono-ammonium and di-ammonium phosphates), potassium-based (e.g. potash or muriate of potash) fertilizers, and any of a variety of N—P—K compound fertilizers, with or without secondary nutrients such as sulfur or sulfur compounds, calcium, and magnesium, and/or micronutrients such as iron, manganese, zinc, copper, boron, molybdenum, and chlorine. In one non-limiting embodiment, the fertilizer granules are formed using the granulation methods described in U.S. Pat. No. 6,544,313 entitled "Sulfur-Containing Fertilizer Composition and Method for Preparing Same," incorporated herein by reference in its entirety. In another non-limiting embodiment, the fertilizer granules are formed using the granulation methods described in U.S. Pat. No. 7,497,891 entitled "Method For Producing A Fertilizer With Micronutrients," incorporated herein by reference in its entirety.

Depending on the desired temperature and moisture content of the fertilizer granules before application of the aqueous conditioning agent, optional application of heat and/or air 104 may be necessary or desired. For example, IR heat, gas fired heat, or any of a variety of heat sources can be applied to the plurality of fertilizer granules to dry and/or heat the granules to the target surface temperature and/or moisture content before application of an aqueous conditioning agent at 108. In one embodiment, the target surface temperature of the granules is approximately about 50° F. to about 250° F., and more particularly about 130° F. to about 200° F., and the target moisture content is about 0 to about 6.5 weight percent (wt %), more particularly from about 0.5 wt % to about 3 wt % and more particularly from about 0.5 wt % to about 1.5 wt %

Once the granules are at the target temperature and moisture content, they are placed into a conditioning vessel at 106, such as a tumbling drum or bed, flighted drum or bed, or fluidized bed for application of the one or more aqueous conditioning agents. In one embodiment, the conditioning vessel includes one or more sprayers or nozzles for the spray application of one or more aqueous conditioning agents at 108, with or without beneficial agricultural and/or dedusting additives. As discussed above, the aqueous conditioning agent can comprise water or a water-based solution, in the form of liquid, steam, and/or superheated steam, and with or without beneficial agricultural and/or dedusting additives. The aqueous conditioning agent is introduced at a temperature of about 32° F. to about 800° F. depending on the form of the agent, and more particularly from about 70° F. to about 170° F. when the agent is in the form of liquid water or a water-based solution, with or without beneficial agricultural and/or dedusting additives.

As mentioned above, the aqueous conditioning agent can optionally contain one or more beneficial agricultural and/or dedusting additives, such as, for example, acidifying agents, drying agents, chelating agents, micronutrients, secondary nutrients, biological materials, pesticides and herbicides.

Acidifying agents can include, but are not limited to, citric acid, sulfuric acid, phosphoric acid, sulfamic acid, and combinations thereof. Drying agents can include, but are not limited to, corn starch, and/or wheat starch. Chelating agents can include, but are not limited to, ethylenediaminetetraacetic acid (EDTA), polyethylenimine (PEI), or combinations thereof. Any of the agents can be added in an amount of about 0.01 wt % to about 99.99 wt % of solution, and more particularly from about 0.01 wt % to about 20 wt % of solution for certain applications, from about 20 wt % to about 50 wt % of solution for other applications, and from about 50 wt % to about 99.99 wt % for yet other applications.

In addition to or as an alternative to the additives listed above, the aqueous conditioning agent can contain one or more beneficial agricultural additives selected from one or any combination of secondary nutrients and/or micronutrients in an amount of about 0.01 wt % to about 99.99 wt % of solution, and more particularly from about 20 wt % to about 50 wt % of solution. The secondary nutrients can include, for example, sulfur compounds, calcium, and/or magnesium, and the micronutrients can include, for example, iron, manganese, zinc, copper, boron, molybdenum, and/or chlorine.

In addition to or as an alternative to the additives listed above, the aqueous conditioning agent can contain one or more beneficial agricultural additives selected from one or any combination of biological material. In some cases, biological material, or "biologicals," can comprise microorganisms, including, but not limited to, bacteria such as *Bacillus, Rhizobium, Azobacter*, and *Azospirillum*, fungi such as *Aspergillus, Mycorhizzae, Beauveria, Metarhizium*, and *Trichoderma*, and/or yeast such as *Saccharomyces, Schizosaccharomyces, Sporobolomyces, Candida, Trichosporon*, and *Rhodosporidium*. In other cases, the aqueous conditioning agent can comprise biologicals that are not microorganisms, including, but not limited to, small molecule and peptide-based compositions such as metabolites, peptides, lipopeptides, hormones, peptide hormones, siderophores, glycopepetides, humates, surfactants, vitamins, enzymes, amino acids and amino acid derivatives, and nucleic acids and nucleic acid derivatives.

In some embodiments, biologicals included in embodiments of the aqueous conditioning agent can be applied to fertilizers or fertilizer granules at a final concentration of about $10^3$ to about $10^{12}$ CFU (colony forming units)/g, and more particularly about $10^6$ to about $10^9$ CFU/g $10^6$ to about $10^9$ CFU. For example, 4.1 mls of an aqueous solution comprising biologicals can be added to 1 lb of fertilizer, or about $10^{12}$ to about $10^{15}$ CFU/L can be added to liquid fertilizer to achieve the above target concentration. In some cases, biologicals included in embodiments of the aqueous conditioning agent can be applied at temperatures ranging from about 70° F. to about 210° F., or more particularly, from about 70° F. to about 180° F., or more particularly, from about 70° F. to about 160° F. Biologicals applied accordingly have the potential to enhance the growth and development of plants as well as treat plant diseases.

In an alternative embodiment, one or more of the beneficial agricultural and/or dedusting additives described above are optionally introduced at 111 onto the surface of the granules separate from the aqueous conditioning agent (with or without additives). The one or more beneficial agricultural and/or dedusting additives can be added simultaneously or in series with (e.g. upstream and/or downstream from) the aqueous conditioning agent, such as by spraying, in conditioning vessel 106.

In one non-limiting embodiment, the aqueous conditioning agent is added at 108 in an amount of about 0.1 to about 10 wt % of the total weight of the fertilizer, and more particularly from about 2.0 to about 4.0 wt % of the total weight of the fertilizer. This can be accomplished, for example, by the addition of aqueous conditioning agent at a rate of about 0 to about 22 gallons per ton of granular fertilizer, and more particularly about 5-10 gallons per ton of granular fertilizer, depending on the composition or concentration of the aqueous conditioning agent, and the desired amount of aqueous conditioning agent per granule.

In one embodiment, simultaneously with or after the application of the aqueous conditioning agent at 108, the granules are optionally subjected to mechanical energy at 110 in the form of agitation, such as shaking and/or tumbling, within the conditioning vessel 106 to promote or induce mechanical interaction between granules. The conditioning vessel can further optionally include mixing equipment such as, a ribbon blender, paddle mixer, baffles, and/or can comprise a rotating drum such that the application of the aqueous conditioning agent is spread evenly over the granules, and to further induce mechanical interaction between the granules.

In an alternative embodiment, the granules and the aqueous conditioning agent are introduced into a fluidized bed reactor such that surfaces of the granules are subjected to surface conditioning described above, without necessarily being subjected to particle to particle interaction or mechanical energy exposure. Optionally, one or more beneficial agricultural and/or dedusting additives can be added to the fluidized bed separately from the aqueous conditioning agent (with or without additives).

During and/or after the optional application of energy at 110, the extra moisture from the application of the aqueous conditioning agent is removed at 112. In one embodiment, removal of the moisture at 112 can be accomplished without additional equipment and/or processing. For example, a previously established airflow, such as a ventilation means or duct for removing fugitive dust, water vapor, or other ventilation such as a fluid bed dryer, moves air that is sufficiently dry through vessel 106 to remove the added moisture.

In another embodiment of the invention, one or more gases are supplied to or moved through the vessel at 114 to remove the added moisture from the granules. The one or more gases can be, for example, recycled and/or fresh air, and/or an inert gas such as argon or nitrogen. The gas can be completely dry, or have a low or negligible moisture content. In a particular embodiment, the gas includes one or more beneficial agricultural and/or dedusting additives or agents as described above for application to the granule surface.

In yet another embodiment, the latent heat of the fertilizer granules is sufficient to dry the granules by evaporation of the moisture to the surrounding atmosphere of the vessel 106. The air of the vessel 106 is removed and replaced as needed. In yet another embodiment, the granules are subjected to the application of dry air and/or heat in a separate drying vessel (not shown), such as a fluid bed dryer. In each of the embodiments, the added moisture is removed until a final moisture content of about 0 to about 6.5 weight percent (wt %), more particularly from about 0.5 wt % to about 3 wt % and more particularly from about 0.5 wt % to about 1.5 wt % of the granules is achieved, resulting in conditioned fertilizer granules.

The conditioned fertilizer granules are removed at 116 are then shipped to storage and/or end-use customers, or are reconditioned or further conditioned or processed as desired.

As discussed above, the conditioning of the granular fertilizers by water treatment allows for the reduction in application of dust control agents, such as the oil-based coatings, thereby reducing raw material costs and/or manufacturing costs. Also, reduction in dust generated during distribution from the manufacturer to the grower results in improved industrial hygiene for the manufacturers, transporters, customers, and/or customer employees, thereby reducing the costs and equipment otherwise needed to mitigate industrial hygiene issues.

Table 1 below lists breakage results comparing conditioned fertilizer granules conditioned with an aqueous conditioning agent in the form of water in weight percent to unconditioned fertilizer granules. In this example, the base fertilizer was monoammonium phosphate and the breakage was measured.

In particular, an accelerated performance measurement procedure used to measure this data consists of the following steps: (1) Initially untreated fertilizer granules are split (with a riffler) to maintain comparable fractions; (2) The baseline granules are not treated with an aqueous conditioning agent while the remaining granules coated with different experimental treatments of different amounts of aqueous conditioning agent; (3) The coated samples are stored under controlled environmental conditions reflecting potential product transportation and storage conditions; and (4) The effectiveness of dust control is measured after several (2, 4, 6, 8) weeks. To measure effectiveness of dust control, samples are removed from the environmental chamber and exposed to a controlled energy input to simulate product handling. Dust sized particles from each sample are then extracted and the dust level is determined by mass difference. The reduction percentage is calculated as a percent change (in this case reduction) from the dust generation of the baseline samples.

TABLE 1

| | Breakage results | |
|---|---|---|
| Conditioning agent added (% of fertilizer weight) | Typical dust generation reduction | Optimal dust generation reduction |
| 2% | 30% | 55% |
| 3.5% | 55% | 80% |
| 5% | 60% | 85% |

In other embodiments, such surface treatments and/or incorporation of additives or agents by the above methods may result in reduced caking tendencies by means of inhibiting chemical and/or physical interactions between granules in storage, during transport, or otherwise.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

What is claimed is:

1. A method for conditioning inorganic phosphate fertilizer granules for improved dust control, agricultural benefits, or both, the method comprising:
    providing a plurality of inorganic phosphate fertilizer granules in a conditioning vessel, the granules having a surface temperature of about 50° F. to about 250° F.;
    introducing a quantity of an aqueous conditioning agent into the conditioning vessel in an amount of about 0.1 wt % to about 10 wt % of the total weight of the inorganic phosphate fertilizer granules;
    subjecting the inorganic phosphate fertilizer granules with the aqueous conditioning agent thereon to a mechanical energy exposure by mixing or tumbling the inorganic phosphate fertilizer granules in the conditioning vessel to promote particle to particle interaction; and removing moisture from the inorganic phosphate fertilizer granules until a final moisture content of the fertilizer granules is 0 wt % to about 6.5 wt % of the granules, wherein the aqueous conditioning agent comprises a solution or suspension of water and an agent selected from the group consisting of:
- an acidifying agent comprising citric acid, sulfamic acid, sulfuric acid, phosphoric acid, or combinations thereof;
- a drying agent comprising corn starch, wheat starch, or combinations thereof;
- a chelating agent comprising ethylenediaminetetraacetic acid (EDTA), polyethylenimine (PEI), or combinations thereof; and
- combinations thereof.

2. The method of claim 1, wherein the aqueous conditioning agent further comprises a secondary nutrient, a micronutrient, or a combination thereof.

3. The method of claim 2, wherein the secondary nutrient is selected from the group consisting of: a source of sulfur; a source of calcium; a source of magnesium; and combinations thereof.

4. The method of claim 2, wherein the micronutrient is selected from the group consisting of: a source of iron; a source of manganese; a source of zinc; a source of copper; a source of boron; a source of molybdenum; a source of chlorine; and combinations thereof.

5. The method of claim 1, wherein introducing the quantity of the aqueous conditioning agent into the conditioning vessel comprises spraying the aqueous conditioning agent onto the inorganic phosphate fertilizer granules in the conditioning vessel, wherein the aqueous conditioning agent is introduced at a temperature of about 32° F. to about 800° F.

6. The method of claim 1, wherein the conditioning vessel includes mixing equipment selected from the group consisting of a ribbon blender, paddle mixer, baffles, and combinations thereof.

7. The method of claim 1, wherein the conditioning vessel comprises a rotating drum such that application of the aqueous conditioning agent is spread evenly over the granules, and to further induce mechanical interaction between the granules.

8. A method for conditioning inorganic phosphate fertilizer granules for improved dust control, agricultural benefits, or both, the method comprising:
providing a plurality of inorganic phosphate fertilizer granules in a conditioning vessel, the granules having a surface temperature of about 50° F. to about 250° F.;
introducing a quantity of an aqueous conditioning agent into the conditioning vessel in an amount of about 0.1 wt % to about 10 wt % of the total weight of the inorganic phosphate fertilizer granules;
subjecting the inorganic phosphate fertilizer granules with the aqueous conditioning agent thereon to a mechanical energy exposure by mixing or tumbling the inorganic phosphate fertilizer granules in the conditioning vessel to promote particle to particle interaction; and
removing moisture from the inorganic phosphate fertilizer granules until a final moisture content of the fertilizer granules is 0 wt % to about 6.5 wt % of the granules,
wherein the aqueous conditioning agent comprises a solution or suspension of water and a biological agent, wherein the biological agent comprises at least one biological material.

9. The method of claim 8, wherein the biological material comprises one or more microorganisms.

10. The method of claim 9, wherein the microorganism is bacteria selected from the group consisting of *Bacillus, Rhizobium, Azobacter, Azospirillum*, and combinations thereof.

11. The method of claim 9, wherein the microorganism is fungi selected from the group consisting of *Aspergillus, Mycorhizzae, Beauveria, Metarhizium, Trichoderma, Saccharomyces, Schizosaccharomyces, Sporobolomyces, Candida, Trichosporon, Rhodosporidium*, and combinations thereof.

12. The method of claim 8, wherein the biological material is selected from the group consisting of metabolites, peptides, lipopetides, hormones, peptide hormones, siderophores, glycopepetides, humates, surfactants, vitamins, enzymes, amino acids, amino acid derivatives, nucleic acids, nucleic acid derivatives, and combinations thereof.

13. The method of claim 8, wherein the biological material comprises bacteria, fungi, or both, and wherein the biological material is applied to fertilizers or fertilizer granules at a final concentration of about $10^3$ to about $10^{12}$ CFU/g.

14. The method of claim 13, wherein the biological material is applied to fertilizers or fertilizer granules at a final concentration of about $10^6$ to about $10^9$ CFU/g.

15. The method of claim 8, wherein the biological material is sprayed on the fertilizer or fertilizer granules as an aqueous solution, and then dried leaving the biological material deposited on the fertilizer or fertilizer granule.

16. A method for conditioning inorganic phosphate fertilizer granules for improved dust control, agricultural benefits, or both, the method comprising:
providing a plurality of inorganic phosphate fertilizer granules in a conditioning vessel, the granules having a surface temperature of about 50° F. to about 250° F.;
introducing a quantity of an aqueous conditioning agent into the conditioning vessel in an amount of about 0.1 wt % to about 10 wt % of the total weight of the inorganic phosphate fertilizer granules;
subjecting the inorganic phosphate fertilizer granules with the aqueous conditioning agent thereon to a mechanical energy exposure by mixing or tumbling the inorganic phosphate fertilizer granules in the conditioning vessel to promote particle to particle interaction; and
removing moisture from the inorganic phosphate fertilizer granules until a final moisture content of the fertilizer granules is 0 wt % to about 6.5 wt % of the granules, wherein the aqueous conditioning agent consists of water.

* * * * *